Patented July 26, 1938

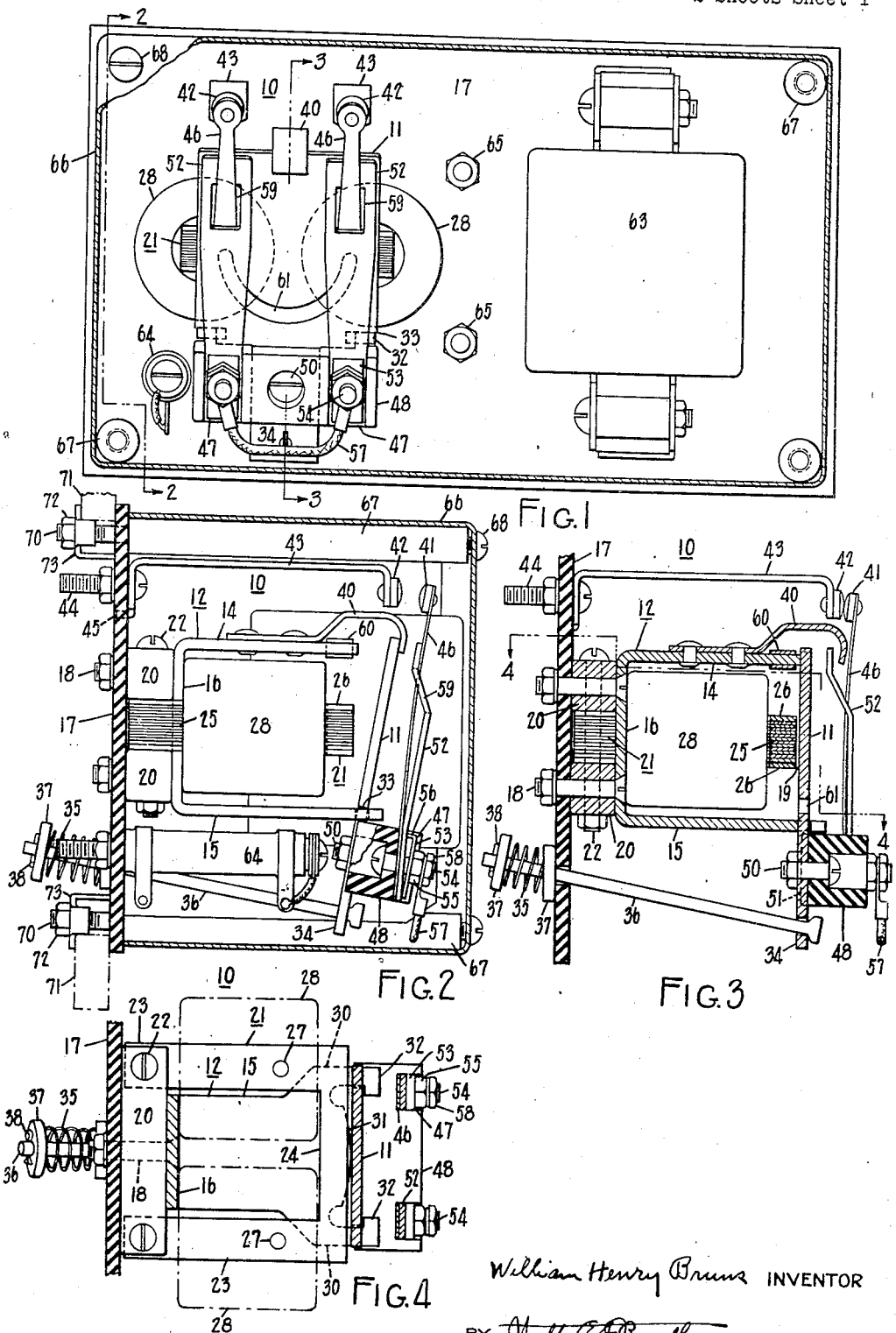

2,125,149

UNITED STATES PATENT OFFICE 2,125,149

ELECTROMAGNETIC CONTROL DEVICE

William Henry Bruns, Yonkers, N. Y., assignor to Otis Elevator Company, New York, N. Y., a corporation of New Jersey Application March 20, 1936, Serial No. 69,761

5 Claims. (Cl. 175—294)

The invention relates to control mechanism and especially to switching mechanism for protective purposes.

The invention involves the utilization of the combined effect of the fluxes in a plurality of magnetically interrelated flux paths of a relay to determine the amount of pull exerted on the relay armature.

The object of the invention is to provide a relay operating upon these principles, which is of simple construction, cheap to manufacture and reliable in operation.

In carrying out the invention, according to the preferred arrangement, the relay is provided with two operating coils. These coils are mounted on opposite legs of a closed core. The armature of the relay is arranged opposite a closed end of the core. The armature is moved to attracted position whenever the net resultant of the fluxes in the two legs passing between the core and the armature is above a certain amount. The coils are wound and connected in the circuits so that when certain conditions exists in the circuits, a net resultant flux is caused to flow between the core and the armature sufficient to operate the relay. Under other conditions in the circuits, the net resultant flux is not sufficient to move the armature to or hold it in attracted position. Flux not crossing the air gap between the core and armature circulates in the closed core.

Features and advantages of the invention will be apparent from the specification and appended claims.

The relay is useful for various purposes. It is of particular advantage for reverse phase and single phase protection of a motor. Application of the relay to a polyphase alternating current system to protect a motor against phase reversal and phase failure will be described.

In the drawings:

Figure 1 is a view in front elevation of a relay embodying the invention and associated equipment mounted on a panel;

Figure 2 is a view in section taken along the line 2—2 of Figure 1;

Figure 3 is a view, with parts omitted, in section taken along the line 3—3 of Figure 1;

Figure 4 is a section taken along the line 4—4 of Figure 3 with the coils of the relay shown in dot and dash outline.

Figure 5:
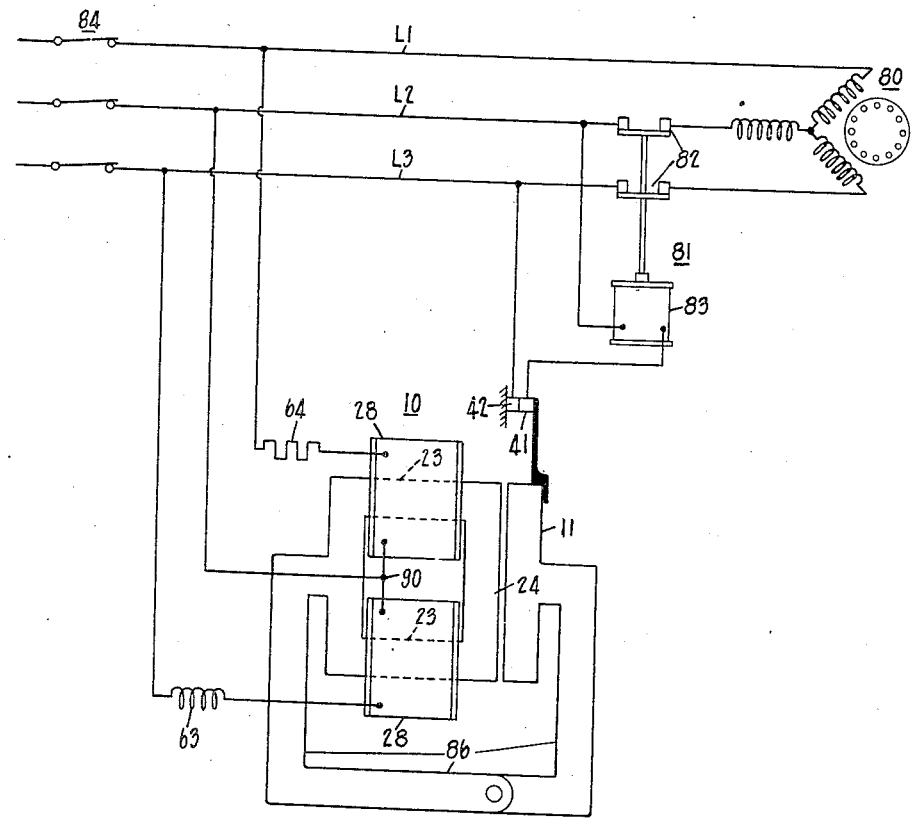
Figure 5 is a simplified wiring diagram illustrating the relay as utilized to protect a three phase motor against phase reversal and phase failure.

Referring to Figures 1, 2, 3 and 4 of the drawings, the relay, designated as a whole by the numeral 10, comprises a movable armature 11 supported on a magnet frame 12. Frame 12 comprises an upper horizontal portion 14 and a lower horizontol portion 15 joined by base portion 16. Frame 12 is secured at its base to an insulating panel 17 by means of the screws 18. Screws 18 also serve to clamp a pair of vertically spaced blocks 20 of magnetic material between the base of the frame and the panel. The screws are countersunk in the base of the frame and pass through apertures in the blocks. Each of the blocks extends beyond the frame on each side thereof. A U-shaped core 21 is clamped at its open end between the ends of the blocks by means of screws 22. The legs 23 of the core extend horizontally outward from the panel on each side of the base 16. The yoke 24 of the core is positioned adjacent the armature 11. The upper horizontal portion 14 extends a slight distance beyond the yoke of the core. The armature engages portion 14 when in attracted position, thus providing an air gap between the armature and core. Core 21 comprises a plurality of laminations 25 secured between outer plates 26 as by rivets 27. A pair of magnet coils 28 are mounted on core 21, one on each leg 23. The legs 23, yoke 24 and blocks 20 form a closed core for the magnet coils 28.

The armature is pivotally supported on lower horizontal portion 15 of the frame 12. To provide this support, the portion 15 is widened out and is formed with a pair of arms 30. The ends of the arms are formed with hook portions 32. The armature is narrowed at the point where it is supported by portion 15 to enable it to be inserted between the arms 30 in back of the hook portions 32. The shoulders 33 thus formed on the armature rest on the arms 30, thus providing a pivotal support for the armature. Between the arms 30, portion 15 is formed with an arcuate edge 31. This edge provides a point contact for the face of the armature, which permits the armature to seat itself flatly against the edge of upper portion 14 of the frame when in attracted position. The hook portions 32 act to retain the armature on portion 15, sufficient clearance being provided between the hooks and the armature to permit the armature to move freely on its being attracted or released and to seat itself properly when in attracted position.

The armature is biased to unattracted position by means of a spring 35. This spring is arranged on a rod 36 which extends through an aperture provided in the lower end of the armature and through an aperture in the panel. The spring is mounted on the rod at the back of the panel and is held under compression between cup-shaped washers 37. A cotter pin 38 maintains the washer at the end of the rod in place. The end of the rod adjacent the armature is flattened to prevent the rod pulling through the aperture in the armature. The outward pivotal movement of the armature is restricted by a stop 40. The stop is riveted to the upper horizontal portion 14 of the frame and extends over into position to contact the back of the top edge of the armature when the armature is in unattracted position.

The relay is illustrated as provided with a pair of movable contacts 41 for cooperation with a pair of stationary contacts 42. Each stationary contact is carried by an elongated bracket 43 mounted on the panel. The outer and inner ends of the bracket are bent downward at right angles. The contact point is secured in a hole drilled in the outer end of the bracket. The other end of the bracket is secured to the panel as by a screw 44. A tab 45 provided on the inner end of the bracket extends into an aperture in the panel. This prevents the bracket from turning on the panel.

The movable contacts 41 are carried by the armature. Each contact comprises a leaf spring 46 having a contact point secured in an aperture in the contacting end of the spring. The lower end of each spring is arranged in a slot 47 provided in one side of a contact base 48. The contact base is of insulating material and is secured to the armature below its hinge point by means of a screw 50, which is countersunk in the block. The armature is further narrowed at its lower end 34 and the base is provided with a groove 51 which fits over the end 34 to locate the base on the armature. The bottom of each of the slots 47 slopes inwardly as shown in Figure 2. A spring guard 52 is also arranged in each slot. The springs are held against the bottom of their respective slots and the spring guards are held against their respective springs by means of clips 53 and screws 54. The screws are countersunk in the back of the block and pass through holes provided in the clips. The nuts 55 for screws 54, when tightened, press an angular end 56 of each clip against its respective spring guard, thereby securing the contact springs in place. The contacts may be bridged by a connector 57 secured to the screws 54 by nuts 58. Each spring guard extends upward from base 48 and is provided with a square shaped aperture 59 through which its respective contact spring extends. This arrangement prevents excessive flexing of the contact springs.

The armature is attracted by flux passing from the core through the armature and back to the core through the frame 12. A shading coil 60 is provided to minimize noise when the armature is in attracted position. This coil is arranged on the upper portion 14 of the frame to take advantage of the leverage of the armature on the amount of pull which the shading coil produces. The outer end of portion 14 is slotted to receive the shading coil. To obtain a maximum effect from the shading coil, a majority of the flux passing between the core and the armature, when the armature is in attracted position, is caused to return through the upper horizontal portion 14 of the frame. This is effected by providing a slot 61 across the face of the armature. This slot is positioned so as to crowd the flux received by the armature from the core upwardly for return through upper portion 14 of the frame. In this way, the shading coil is subjected to a considerable amount of flux so that it is capable of exerting sufficient pull on the armature to minimize any chatter. As illustrated, this slot is of an arcuate shape but other arrangements, such as a horizontal slot, may be employed. The action of the shading coil is augmented by the armature seating itself flatly against the edge of portion 14 due to the point contact of the armature at its hinge with the arcuate edge of the lower portion 15 of the frame.

Impedance is utilized to control the phase relationship of the currents supplied to coils 28. An inductive reactance 63 and a resistance 64 are illustrated for this purpose. The inductance and resistance are mounted on panel 17. Binding posts 65 are provided on the panel for connecting the coils of the relay in the control circuits.

The relay and its inductance and resistance have been illustrated as a unit provided on a separate panel portion. A cover 66 is provided for this unit. The cover fits over and is supported by studs 67, one at each corner of the panel. The cover is secured to the studs as by screws 68, which fit into tapped holes in the outer ends of the studs. The other end 70 of each stud is threaded and extends through the panel. The panel may be mounted on cross bars 71 as shown in Figure 2. The panel is clamped to the bars at both the top and the bottom. Each clamp is formed by providing a nut 72 on the threaded end 70 of the stud to clamp a clip 73 against the mounting bar.

In Figure 5 of the drawings, a schematic wiring diagram shows how the relay 10 as described above may be utilized to provide protection for a three phase alternating current motor against phase failure and phase reversal. The supply of current for the motor from the source is illustrated as controlled by switch 81. Switch 81 in turn is controlled by relay 10. L1, L2 and L3 designate the alternating current supply mains, while the main line switch is designated as 84. The motor is designated as a whole as 80. The operating coil 83 of switch 81 is connected through contacts 41, 42 of relay 10 across supply lines L2 and L3. When the contacts of the relay are closed as shown, coil 83 of switch 81 is energized, causing the engagement of contacts 82 in the circuit for the motor. The opening of the contacts of the relay causes switch 81 to drop out.

Although relay 10 is illustrated as acting through switch 13 to control the motor, it is to be understood that the contacts of relay 10 may be located in a circuit common to the coils of the various electromagnetic switches of the controller for the motor.

The coils 28 of relay 10 are connected across different phases of the source of supply. One coil is connected through resistance 64 across supply mains L1 and L2. The other coil is connected through inductance 63 across supply mains L2 and L3. The inductance and resistance are for obtaining the desired phase and value of the currents supplied to the coils of the relay.

In operation, when main line switch 84 is closed, if the voltages of the supply mains are in proper phase rotation, the net resultant of the fluxes produced by the coils flowing to the armature is sufficient to move the armature to attracted position. The armature, upon being attracted, engages contacts 41, 42, energizing coil 83 of switch 81. Switch 81 in turn engages its contacts 82 in the circuit for the motor. Should the phase rotation be reversed at the time main line switch 84 is closed, the net resultant of the fluxes produced by the coils flowing to the armature is not sufficient to move the armature to attracted position. Thus switch 81 is not energized. Should there be no voltage on one of the supply mains at the time switch 84 is closed, there is substantially no resultant flux flowing to the armature so that the armature is not attracted.

Relay 10 is represented schematically in Figure 5 in order that the principles involved may be more readily understood. As before, the legs of the closed core are designated 23, the yoke 24 and the armature 11. 86 designates the return path for the flux from the armature to the closed core. For convenience, this return path is shown as through the hinge for the armature but, as previously explained, the majority of the return flux is forced through the upper portion 14 of frame 12 when the armature is in attracted position.

The coils of the relay may be wound so that current flow in the coils in the same direction with respect to junction point 90 or so that current flow in the coils in opposite directions with respect to point 90 produces a flux in each leg of the core in the same direction with respect to armature 11. It will be assumed, for purposes of explanation, that the coils are wound so that flux is obtained in the two legs in the same direction with respect to the armature when current flows in the coils in the same direction with respect to point 90. With the coils supplied with current from different phases of a three phase alternating current source of supply, the portion of each alternating current cycle in which current flows in the same direction with respect to point 90 depends upon the manner in which the coils are connected to the supply lines and the value of inductance 63. To obtain operation of the relay as above described, the coils are connected to the supply mains in such way that with the voltages applied thereto in proper phase rotation, current flow in the coils in the same direction with respect to point 90 is obtained during the majority of each alternating current cycle. In other words, the currents in the coils with respect to point 90 are in an assisting phase relationship, the actual phase relationship being dependent on the value of inductance and resistance of the circuits. The flux produced by each coil being in phase with the current supplied to that coil, the fluxes in the two legs are in the same direction with respect to the armature during the majority of each alternating cycle. By proper selection of inductance and resistance values in the circuits, sufficient flux is caused to flow between the core and the armature during proper phase rotation to pull the armature to attracted position.

When the phase rotation of the voltages applied to the coils is reversed, current flow in each coil in the same direction with respect to point 90 is obtained only during a relatively small portion of each cycle. That is, the currents in the coils with respect to point 90 are in an opposing phase relationship, the actual phase relationship being dependent as before on the value of the inductance and resistance of the circuits. The values of inductance and resistance chosen are such that the net resultant flux which is caused to flow between the core and the armature during reverse phase rotation is insufficient to pull the armature to attracted position.

When the currents supplied to the coils are in opposite direction with respect to point 90, the flux which does not pass between the core and armature circulates in the closed core.

When a phase failure occurs, the net resultant flux flowing between the core and the armature is substantially zero so that no pull is exerted on the armature to pull it in. If either main L1 or main L3 is the one which fails, no current is supplied to one of the coils from the supply mains and no flux is produced by that coil. Therefore, there can be no flux in the leg on which that coil is mounted in the same direction with respect to the armature as the flux produced in the other leg by the energized coil thereon. In other words, there is no flux to oppose the flow of the flux created by the energized coil in the leg upon which the other coil is mounted so that the greater part of the flux created by the energized coil flows to this leg by way of the yoke 24, thereby circulating in the closed core instead of being forced across the air gap. Thus substantially no pull is exerted on the armature.

Should supply main L2 be the one which failed, both coils are placed in series across lines L1 and L3 so that the same current passes through both coils. Under such conditions, the flow of current in the coils with respect to junction point 90 is opposite. Thus, the fluxes produced in the legs are always in opposite directions with respect to the armature under such conditions. The flux therefore circulates in the closed core instead of being forced across the air gap so that no pull is exerted on the armature. The total flux is the same as when either line L1 or line L3 fails as the voltage applied to each coil is halved.

Thus, it is seen that relay 10 acts to protect the motor against reverse phase conditions, and also against phase failure regardless of which supply lines control switch 81 is connected to.

Although the invention has been described as applied to an electromagnetic relay affording reverse phase and single phase protection on a polyphase alternating current system, it is to be understood that the principles involved may be utilized for other devices, either in connection with alternating or direct current systems. For example, the invention may be embodied in a load relay in which one coil is wound as a current coil and is connected in series with the motor and the other coil is wound as a voltage coil and is connected so as to be subject to the voltage applied to the motor.

Many changes could be made in the above construction without departing from the scope of the invention. This includes not only variations in the constructional details of the relay but also changes in the flux paths or other changes which alter the manner in which the algebraic sum of fluxes is utilized to effect the operation of the relay. Condensive reactance may be utilized in controlling the phase relationships of the currents supplied to the coils of the relay, either in place of the inductive reactance or resistance or in combination therewith. It is therefore intended that all matter contained in the above description or shown in the accompanying drawings shall be interpreted as illustrative and not in a limiting sense.

What is claimed is:

1. In a system of control for a polyphase alternating current motor adapted for connection to supply mains from a polyphase alternating current source of supply; a relay comprising, contacts for controlling the connection of said motor to said source, an armature, two cores extending toward said armature, an electromagnet coil mounted on each core, and a magnetic shunt for the ends of said cores adjacent said armature; phase displacing means; and means connecting said coils with said phase displacing means in circuit with one of them across different ones of said supply mains in such way that, when the voltages of said supply mains are in proper phase rotation, the majority of the flux produced in said cores by said coils flows between said cores and said armature, whereby the armature is pulled to attracted position only when the voltages of said supply mains are in proper phase rotation.

2. In a system of control for a polyphase alternating current motor adapted for connection to supply mains from a polyphase alternating current source of supply; a relay comprising, contacts for controlling the connection of said motor to said source, a closed core, two electromagnet coils mounted on different portions of said core, an armature for operating said contacts, means for mounting said armature to receive flux from said core between certain ends of said coils, and magnetizable means providing a magnetic path for returning the flux passing from said core to said armature to said core between the other ends of said coils, flux not passing between said core and said armature circulating in said core; reactance means; and means for connecting said coils with said reactance means in circuit with one of them across different ones of said supply mains in such way that, when the voltages of said supply mains are in proper phase rotation, the majority of the flux produced by said coils flows between said core and said armature, whereby the armature is pulled to attracted position only when the voltages of said supply mains are in proper phase rotation.

3. In a system of control for a polyphase alternating current motor adapted for connection to supply mains from a polyphase alternating current source of supply; a relay comprising, contacts for controlling the connection of said motor to said source, a rectangular shaped closed core, two electromagnet coils mounted on opposite legs of said core, an armature for operating said contacts, means for mounting said armature to receive flux from one end of said core, and magnetizable means providing a magnetic path for returning the flux passing from said core to said armature to the other end of said core, said core providing a path for the circulation of flux not passing between the core and said armature; inductive reactance means; and means for connecting said coils with said reactance means in circuit with one of them across different ones of said supply mains in such way that the effective value of the flux flowing between said core and said armature is sufficient to pull the armature to attracted position when the voltages of said supply mains are in proper phase rotation but is insufficient to do so when said voltages are in reverse phase rotation or when a single phase condition exists.

4. In a system of control for a polyphase alternating current motor adapted for connection to a polyphase alternating current source of supply; a relay comprising, contacts for controlling the connection of said motor to said source, an armature, and a magnet for moving said armature to attracted position to operate said contacts, said magnet comprising two spaced parallel cores extending toward said armature, a magnet coil mounted on each core, magnetizable means providing a path for flux passing between the ends of said cores adjacent said armature and said armature to the other ends of said cores, and magnetizable means joining the ends of said cores to provide a closed path for the circulation of flux which does not pass between said cores and said armature; inductance; resistance; and means for connecting said coils with said inductance in series with one of them and said resistance in series with the other across different phases of said source.

5. In a system of control for a polyphase alternating current motor adapted for connection to a polyphase alternating current source of supply; a relay comprising, contacts for controlling the connection of said motor to said source, an armature, and a magnet for moving said armature to attracted position to operate said contacts, said magnet comprising two spaced parallel cores extending toward said armature, a magnet coil mounted on each core, magnetizable means providing a path for flux passing between the ends of said cores adjacent said armature and said armature to the other ends of said cores, and magnetizable means joining the ends of said cores to provide a closed path for the circulation of flux which does not pass between said cores and said armature; inductance; resistance; and means for connecting said coils with said inductance in series with one of them and said resistance in series with the other across different phases of said source in such way that, with the voltages of said source in proper phase rotation, said coils produce flux in said cores in the same direction with respect to the armature during the majority of each alternating current cycle, thereby causing a net resultant flux to pass between said cores and said armature sufficient to pull the armature to attracted position, that, with the voltages of said source in reverse phase rotation, said coils produce flux in said cores in opposite directions with respect to said armature during the majority of each cycle, thereby causing the net resultant flux passing between said cores and said armature to be insufficient to pull the armature to attracted position, and that, upon the failure of any one of said phases, flux is produced in said cores which is of equal value and opposite in direction with respect to said armature, thereby causing practically all of such flux to circulate in said closed path so that substantially no flux passes between said cores and said armature and no pull is exerted on said armature.

WILLIAM HENRY BRUNS.